Figure 1:
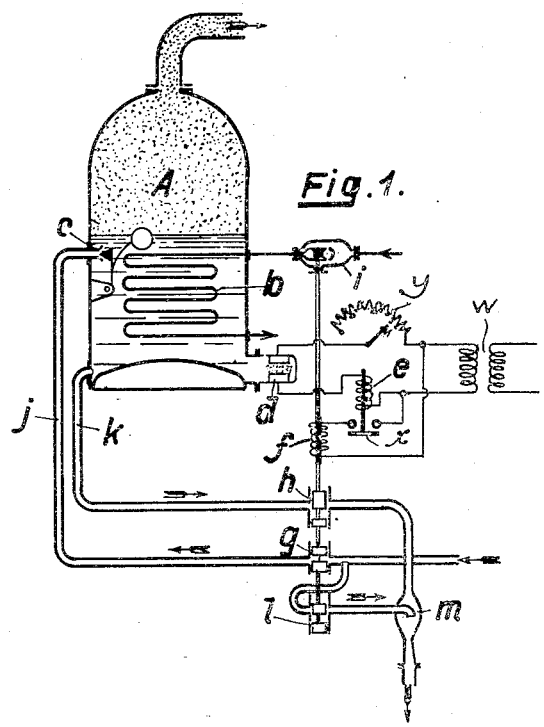

June 24, 1930.  O. FREY  1,766,622
AUTOMATIC CONTROL FOR EVAPORATORS
Filed Feb. 10, 1926

Patented June 24, 1930

1,766,622

UNITED STATES PATENT OFFICE

OTTO FREY, OF WINDISCH, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

AUTOMATIC CONTROL FOR EVAPORATORS

Application filed February 10, 1926, Serial No. 87,467, and in Germany February 14, 1925.

This invention relates to apparatus for the evaporation of liquids. Its general object is the provision of apparatus for the automatic control of admission and discharge of liquid from the evaporating chamber.

A specific object is the provision of apparatus whereby those functions may be controlled automatically in accordance with the density of the medium undergoing evaporation.

Another object is the provision of means for automatically regulating the charging of evaporators in such fashion as to protect them against detrimental contingencies and to maintain an efficient condition of operation.

A further object is the provision of apparatus for controlling operations of a plurality of evaporators in a timed relationship.

Other and further objects will be indicated or pointed out hereinafter or obvious to one skilled in the art, upon an understanding of the present disclosure.

In the drawing forming a part of this specification, I illustrate diagrammatically one arrangement of apparatus embodying or demonstrating the invention but it is intended that the invention may take other and divers structural forms, all within the scope of the appended claims.

Figure 2:
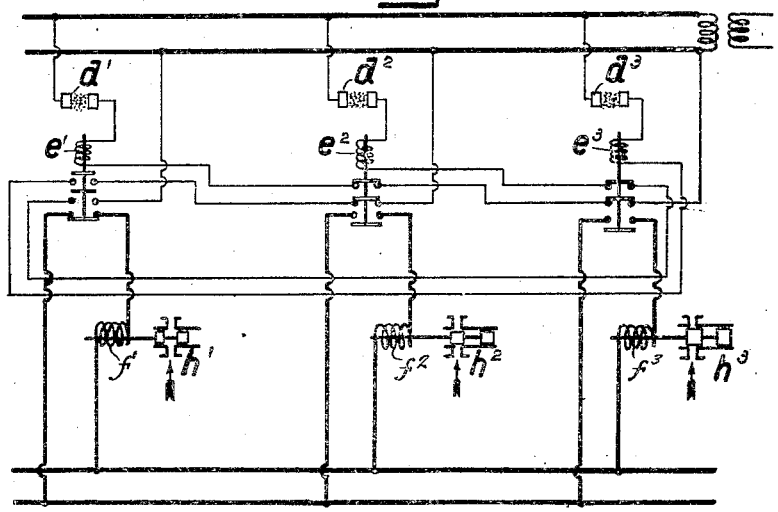

In the drawing,

Fig. 1 is a diagrammatic sectional elevation of an evaporator and associated control apparatus, illustrating the invention, and Fig. 2 is a diagrammatic illustration of control apparatus for a plurality of evaporators.

Whether for recovery of solids or of a distillate, it is advantageous or desirable, under various circumstances, to operate evaporators intermittently, to allow for re-charging or for removal of residual or concentrated portions of the solution. Such is rendered necessary periodically by danger of corrosion from the continuously increasing strength of the concentrate, an excessive raising of the boiling point, which interferes with heat transmission, danger of incrustation, priming or other disturbing factors. Even when operated under watchful supervision, the removal periods may not be properly selected, with the contingent possibilities of damage to the apparatus or the material being treated, or inefficient operation. According to my invention the periodicity is controlled automatically, in some instances by the condition of the material in the evaporator. For an example of apparatus, reference is made to Fig. 1 of the drawing, wherein the character $A$ designates the evaporator in which the treated material is contained and heated from the heating coil $b$ supplied through the valve $i$. The material to be treated is supplied by the pipe $j$, the inlet being controlled by the float operated valve $c$ to maintain a constant level in the evaporator. A drain pipe $k$ is provided at the bottom of the container. An electrolytic indicating or detecting device $d$ is disposed in communication with the lower part of the container and set for the desired limit value of the concentration. This device acts as a switch in the circuit of the relay $e$ which controls the valve-actuating device $f$ through the medium of the switch $x$. The circuit of the relay $e$ and solenoid $f$ is energized from a small transformer $w$. The device is operatively connected with the valve $i$ and the valve $h$, which controls the drain pipe $k$ and the valve $g$ which controls the supply pipe $j$. The valve $l$ also may be operated by the actuating device $f$, for control of a by-pass from the supply line to the ejector $m$ in the drain pipe. The electrolytic detector is of the type which depends on the electrical conductivity of the solution to pass current between its electrodes. As the degree of concentration of the solution in the evaporator increases, the conductivity rises, and when an E. M. F. is applied between the electrodes, the current passing will be proportional to the degree of concentration of the solution. The coil of the relay $e$ is connected in circuit with the electrodes, and is energized to operate the switch $x$ when the current passing the electrodes reaches the necessary value. The device may be set for any desired limit value of current, and accordingly of concentration, by inserting resistance in the circuit by means of the rheostat $y$. Such electrolytic detectors are well known in the art, and are described, for example, in German Patents Nos. 378,276 and 216,397.

In operation, upon the material in the evaporator reaching the critical degree of concentration for which the detector $d$ is set, the relay $e$ will be actuated, the actuating device $f$ energized and the valves $i$, $h$ and $g$ operated respectively to cut off the heat supply, open the drain pipe and close the supply line. Incidentally the valve $l$ is operated to by-pass the supply pressure through the ejector $m$ aiding in the withdrawal of the material from the evaporator through the drain pipe $k$. The ejector arrangement is of utility particularly when the evaporator is operated under vacuum. The detector device is preferably so located that it will not cause the valves to be re-set to the operating positions until all the concentrate has been drawn off.

If the plant comprises a number of evaporators with automatic control, operating in parallel, it is sometimes important that the individual evaporators should be drained alternately so that the heat recovery arrangements may be on a small scale, and overloading of the supply and discharge pipes and ejecting apparatus avoided. For this purpose the control devices of the various evaporators may be suitably interlocked. Fig. 3 shows an example with three evaporators. The first evaporator is just being emptied. The solution in the detector $d'$ has passed a current of sufficient strength to operate the relay $e'$ which closes the operating circuit of the solenoid $f'$ (Fig. 2) and operates the valves $h'$ etc. At the same time the detector circuits of the remaining evaporators are opened so that there is no possibility of the other evaporators being emptied until the first is again in operation.

What I claim is:

1. Evaporating apparatus, comprising, in combination, an evaporating container, a heat supply, a liquid supply pipe, a drain pipe, valves operable respectively to govern the heat supply and liquid-flow through said pipes, and automatically operating means common to said valves and governed by the degree of concentration in the evaporator for operating said valves.

2. The combination with a plurality of evaporators operating in parallel, each having a drainage outlet, of control mechanism for the respective outlets, and automatically operating means associated with each evaporator and governed by the concentrate contained in said evaporator for operating its control mechanism and inhibiting operation of the others.

3. The combination with a plurality of evaporators operating in parallel having respective fluid flow connections, of control mechanism for the connections of the respective evaporators, and automatically operating means for operating the control mechanism of each evaporator and inhibiting operation of that of the others, said means being governed by the concentrate contained in said evaporator.

4. In an evaporating system, a plurality of evaporators operating in parallel, devices associated respectively with said evaporators and governed by the concentrate contained in said evaporators, said devices being operable to control operating action of their respective associated evaporators, and means associated with said devices providing an interlock between said devices and being operable during operation of one of said devices to render the remainder of the same non-effective with respect to their respective associated evaporators.

5. In an evaporator, liquid inlet and outlet valves therefor responsive to a predetermined degree of concentration of the liquid in said evaporator and operable upon occurrence of said degree of concentration to effect substantially simultaneous closing action of said inlet valve and opening action of said outlet valve.

In testimony whereof I have hereunto subscribed my name at Zurich, Switzerland on the 26th day of January, A. D. 1926.

OTTO FREY.